(12) United States Patent
Lluesma Rodríguez et al.

(10) Patent No.: US 12,252,161 B2
(45) Date of Patent: Mar. 18, 2025

(54) COMBINED-PROPULSION SYSTEM AND METHOD FOR HIGH-SPEED LAND VEHICLES, IN A FORCED VACUUM

(71) Applicant: ZELEROS GLOBAL, S.L., Valencia (ES)

(72) Inventors: Federico Lluesma Rodríguez, Valencia (ES); Daniel Orient Martin, Valencia (ES); David Pistoni Pérez, Valencia (ES); Alberto Sánchez Jiménez, Valencia (ES); Juan Vicén Balaguer, Valencia (ES)

(73) Assignee: ZELEROS GLOBAL, S.L., Valencia (ES)

( * ) Notice: Subject to any disclaimer, the term of this patent is extended or adjusted under 35 U.S.C. 154(b) by 311 days.

(21) Appl. No.: 17/792,256

(22) PCT Filed: Dec. 18, 2020

(86) PCT No.: PCT/ES2020/070805
§ 371 (c)(1),
(2) Date: Jul. 12, 2022

(87) PCT Pub. No.: WO2021/144483
PCT Pub. Date: Jul. 22, 2021

(65) Prior Publication Data
US 2023/0044128 A1 Feb. 9, 2023

(30) Foreign Application Priority Data
Jan. 13, 2020 (ES) .............................. ES202030013

(51) Int. Cl.
*B61B 13/10* (2006.01)
*B60L 13/10* (2006.01)
*B61B 13/08* (2006.01)

(52) U.S. Cl.
CPC .............. *B61B 13/10* (2013.01); *B60L 13/10* (2013.01); *B61B 13/08* (2013.01)

(58) Field of Classification Search
CPC ......... B61B 13/08; B61B 13/10; B60L 13/10; B60W 40/67; B60W 60/05; B60W 40/08;
(Continued)

(56) References Cited

U.S. PATENT DOCUMENTS

| 2,511,979 | A | 6/1950 | Goddard | |
|---|---|---|---|---|
| 11,198,451 | B2 * | 12/2021 | Liu | ........................ B61C 15/045 |
| 2021/0114470 | A1 * | 4/2021 | Finodeyev | .............. B60L 50/53 |

FOREIGN PATENT DOCUMENTS

| GB | 1338121 | | 11/1973 |
|---|---|---|---|
| JP | 2002305809 A | * | 10/2002 |

(Continued)

OTHER PUBLICATIONS

Musk, "Hyperloop Alpha", Dec. 8, 2013 (on line) https://www.tesla.com/blog/hyperloop. pp. 1-5; Paragraphs 4.1-4.3, 4.5.
(Continued)

*Primary Examiner* — Andrew Joseph Rudy
(74) *Attorney, Agent, or Firm* — The Webb Law Firm

(57) ABSTRACT

The present disclosure relates to a method and a combined-propulsion system for high-speed vehicles, which includes a closed tubular guiding structure and a vehicle designed to move through the inside of the tubular structure. The system includes a vacuum system coupled to the tubular structure to provide a safe atmosphere at low pressure, always above the Armstrong limit; electric propulsion means arranged in an initial section of the structure, to accelerate the vehicle to a determined cruising speed; and compressed-air propulsion means arranged on the vehicle, to maintain the cruising speed.

13 Claims, 2 Drawing Sheets

(58) Field of Classification Search
CPC ......... B60W 60/0016; B60W 2556/50; B60W 2540/229; B60W 2540/221; B60W 2040/0818
USPC ...................................................... 701/1, 23
See application file for complete search history.

(56) References Cited

FOREIGN PATENT DOCUMENTS

| | | |
|---|---|---|
| KR | 101830638 B1 | 2/2018 |
| KR | 102000741 B1 | 7/2019 |
| RU | 2630268 C1 | 9/2017 |
| WO | 9919195 A1 | 4/1999 |
| WO | 2016126495 A1 | 8/2016 |
| WO | 2019045422 A1 | 3/2019 |

OTHER PUBLICATIONS

Dudnikov, "The Problem of Ensuring the Tightness in Hyperloop Passenger Systems", Eleventh International Conference "Management of Large-Scale System Development", 2018, DOI:10.1109/MLSD.2018.8551881 Section II.

* cited by examiner

COMBINED-PROPULSION SYSTEM AND METHOD FOR HIGH-SPEED LAND VEHICLES, IN A FORCED VACUUM

CROSS-REFERENCE TO RELATED APPLICATIONS

This application is the United States national phase of International Application No. PCT/ES2020/070805 filed Dec. 18, 2020, and claims priority to Spanish Patent Application No. P202030013 filed Jan. 13, 2020, the disclosures of which are hereby incorporated by reference in their entirety.

BACKGROUND OF THE INVENTION

Field of the Invention

The present invention relates to the technical field of transportation systems and more specifically to transportation systems for high-speed vehicles in artificially created low-pressure controlled atmospheres, with a special focus on occupant safety.

Description of Related Art

Today, high-speed land transport systems are undergoing a revolution thanks to the momentum and interest aroused by the possibilities of materializing the Hyperloop concept.

The Hyperloop concept itself was born more than 200 years ago, when English inventor George Medhurst proposed using pressure differences by means of tubes to transport goods and passengers, reducing land transport costs. However, none of his ideas were put into practice until 1859, when the "*London Pneumatic Despatch Company*", an English company pioneer in the transport of small postal packages, was created. For the transport of heavy goods, it would still be necessary to wait until 1867, when Alfred Ely Beach managed to build a system that moved 12 people and a driver on a path 32.6 m long and 1.8 m in diameter. The operation of these pioneer systems basically replicated the operation of a piston, with fans that propelled the vehicle to make the outbound journey or sucked it in to make the return journey.

The proposal to take advantage of the properties of electromagnetism to levitate vehicles would arise 100 years later in Russia, when Professor Boris Weinberg proposed it as a solution to friction losses to reduce system consumption. Along the same lines, other systems arise, such as the one proposed in 1904 by Robert Goddard at the Worcester Polytechnic Institute (United States).

Having established the principles and advantages of these transport systems, pneumatic systems can be found in industrial environments lifting weights of up to 50 kg with tubes of up to 50 cm, but for larger diameters, the energy consumption of the fan becomes excessive and too inefficient. However, technological evolution has allowed the development of the Weinberg system to achieve the transport of larger loads by means of two different solutions: electromagnetic suspension (EMS) and electrodynamic suspension (EDS). These systems manage to lift the weights required for the transport of large-volume goods, but their infrastructure costs are excessively high due, among other things, to the need to add coils (or, alternatively, magnets) along the entire path to propel themselves (as is the case with the Transrapid) or to propel themselves and levitate (as is the case with the SC Maglev).

On the other hand, known levitation systems have been shown to work up to 600 km/h, but to reach higher speeds without excessive energy consumption it is necessary to implement some type of aerodynamic drag reduction system. One of the solutions is the low-pressure tube, as in the 1974 proposal by the Swiss engineer from the Federal University of Laussane, Rudolphe Nieth, who proposed in the Swissmetro concept a combination of magnetic levitation with the reduction of aerodynamic losses by means of a low-pressure tube to reach speeds of up to 500 km/h. This system manages to reduce aerodynamic drag, but the constructive solution requires a tube diameter up to 7 times greater than the diameter of the vehicle to prevent sonic blockage and turbulence generated by the piston effect. Furthermore, the propulsion and levitation system is arranged in the tube by means of linear motors, which ultimately causes the same problem as the known levitation trains having an excessive infrastructure cost.

At this point, when a disruptive advance was necessary to improve the efficiency, speed and safety of high-speed land transport, Elon Musk launched a conceptual proposal in 2013 under the name of Hyperloop. The system works with a tube at very low pressure (1 mbar) and reaches speeds of up to 1220 km/h. The system includes an axial compressor and air bearings in the vehicle to expel compressed air and levitate. This compressed air is stored in tanks of the vehicle and is used by the air bearings to expel it in a controlled manner and maintain the distance between the vehicle and the walls of the tube, generating aerodynamic levitation. In addition, the axial compressor fulfils the function of avoiding sonic blockage by transferring the air through a tube to the rear part of the vehicle. The system requires a discontinuous motor distributed along the entire length of the tube, so that every certain distance the system has a linear motor in the transport tube (similar to Japanese or German levitation trains) that accelerates the vehicle again to the desired speed, since although aerodynamic losses are minimized, the cruising speed decreases as the vehicle moves. However, the advantageous pressure conditions imposed inside the tube for the proper functioning of Hyperloop and similar systems have, in turn, a high risk for the occupants in cases of depressurization. In other words, the high pressure difference between the inside of the tube and the ambient pressure means that a breach in the safety of the vehicle eliminates the oxygen in a matter of seconds, exposing the occupants to conditions close to those of outer space and the consequent risk of death, unless they are wearing a pressurized suit, since it would be equivalent to placing the occupants in the stratopause.

Based on the above, the state of the art is lacking a solution that allows for the implementation of an efficient transport system for vehicles that travel at high speed at low pressure, minimizing energy consumption and guaranteeing the safety of their occupants.

SUMMARY OF THE INVENTION

In order to achieve the objectives and avoid the drawbacks mentioned above, the present disclosure presents a solution that combines efficiency and safety, for which it describes, in a first aspect, a combined propulsion system for high-speed vehicles, comprising a closed tubular guiding structure and a vehicle designed to move inside the tubular structure, wherein the system comprises:

at least one vacuum pump coupled to the closed tubular structure, designed to provide a low-pressure atmosphere inside the structure, wherein the low pressure is always above the Armstrong limit;

electric propulsion means 20 of the linear motor type arranged in an initial section of the structure, configured to provide acceleration to the vehicle up to a first predetermined speed; and compressed-air propulsion means arranged on the vehicle, configured to provide acceleration to the vehicle up to a second predetermined speed and, once the second predetermined speed is reached, maintain the second predetermined speed constant.

In one of the embodiments of the present disclosure, it is considered that the compressed-air propulsion means arranged in the vehicle are configured to start providing acceleration to the vehicle before the vehicle reaches the first determined speed, resulting in a total acceleration of the vehicle during the initial section of the structure which is the sum of the acceleration provided by the linear motor and the compressed-air propulsion means.

In one embodiment, it is considered that the first predetermined speed and the second predetermined speed are equal to a single predetermined cruising speed. In this particular case, the vehicle reaches cruising speed before leaving the initial section of the structure, covered by the electric propulsion means, so that the compressed-air propulsion means will maintain that constant cruising speed for the rest of the journey through the tubular structure.

In one of the embodiments of the present disclosure, the compressed-air propulsion means are additionally configured to be able to regulate the speed of the vehicle, taking it from the second predetermined speed to a third speed. This third speed represents a set of speed values defined in a predetermined speed map for the route that the vehicle will use as a reference, preferably adjusting to it by varying the thrust generated by the compressed air jet.

Mainly for safety reasons, in one of the embodiments of the present disclosure, the low-pressure atmosphere provided by the vacuum pump is in a range between 65 mbar and 250 mbar. Thus, advantageously, a low pressure is maintained, but at the same time risks due to possible depressurization in the vehicles are prevented, so that the occupants have enough time and oxygen to react and use, for example, oxygen masks (as occurs on airplanes).

The forced vacuum conditions provided inside the tubular structure are achieved thanks to the action of a vacuum system with one or more vacuum pumps. In one of the embodiments of the present disclosure, at least one vacuum pump is provided for each kilometer of the tubular structure and direction.

In the present disclosure, the propulsion means for acceleration up to the first preset speed consist of a linear motor located from the beginning of the path and with the necessary length depending on the preset acceleration value that allows the vehicle to reach at least the first speed. In general, said length, for a route of 1000 km, is estimated at less than 10% of the total path, and always measured from the beginning of said path. However, depending on the operating specifications, this percentage can be reduced to approximately 1%, but in very specific cases, of very short routes and for accelerations around 1 m/s2, the threshold of 10% could be exceeded, though not excessively. Thus, advantageously, the structure is much simpler and less expensive to build.

According to one of the embodiments, the compressed-air propulsion means comprise: compression means arranged in a front part of the vehicle, configured to receive and compress air extracted from the line of advance of the vehicle; channeling means configured to receive the compressed air by the compression means and transfer it to a rear part of the vehicle; and an expulsion nozzle arranged in the rear part of the vehicle following the channeling means, configured to receive the compressed air and expel it with a greater linear momentum than what it had in the front part of the vehicle.

In one of the embodiments of the present disclosure, the propulsion means further comprise a turbine arranged after the compression means and the channeling means, configured to recover part of the energy contained in the air passing through the channeling means. Thus advantageously, the system takes advantage of any excess energy in the air flow to move the turbine and generate a certain amount of electrical energy for various uses inside the vehicle.

In a preferred embodiment of the present disclosure, the compressor has a single outlet connected to the channeling means, so that all the air compressed by the compressor is received by the channeling means. Thus, an amount close to or equal to 100% of the air flow extracted from the front of the vehicle is advantageously conducted towards the rear part, which facilitates the advance of the vehicle by reducing aerodynamic drag and prevents possible blockages caused by the passage of air through the channel between the walls of the vehicle and the tube.

In some embodiments of the present disclosure, at least a part of the air compressed by the compressor is not taken to the channeling means but rather is conducted for uses other than propulsion, such as life support, for example.

Optionally, in one of the embodiments of the present disclosure it is contemplated that the channeling means comprise a compressed air tank to store at least part of the air received. Thus, advantageously, a certain amount of air can also be reserved for exceptional needs for extra impulse or others, such as life support or auxiliary support.

A second aspect of the present disclosure relates to a combined propulsion method for a high-speed vehicle configured to move inside a closed tubular guiding structure, wherein the method comprises:

providing, by at least one vacuum pump, a low-pressure atmosphere inside the tubular structure, wherein the low pressure is always above the Armstrong limit;

accelerating, by electric propulsion means 20 arranged in an initial section of the structure, the vehicle from standstill to a first predetermined speed; and propelling, by compressed air propulsion means arranged on the vehicle, the vehicle up to a second predetermined speed and, once the second predetermined speed is reached, keeping it constant.

Providing the low-pressure atmosphere comprises extracting, by the vacuum pump, air from inside the tubular structure until reaching a pressure in the range between 65 mbar and 250 mbar. Propelling the vehicle comprises the propulsion means expelling a compressed air jet from the rear of the vehicle with an energy greater than that of the inlet. Thus, advantageously, the difference in energy caused by the contribution of the compressor to the fluid results in the controlled thrust of the vehicle.

It is contemplated in one of the embodiments of the present disclosure that the step of compressed-air propulsion means propelling the vehicle begins before the vehicle leaves the initial section of the structure and the acceleration step ends. Thus, advantageously a smooth transition between the two propulsion means is achieved, and furthermore, the thrust of the propulsion means, although at a low speed, is not very effective, as the speed increases it helps the electric propulsion means during the acceleration step of the catapult, allowing certain energy savings.

According to one of the embodiments of the present disclosure, the compressed-air propulsion means propelling the vehicle comprises: compression means arranged in a front part of the vehicle extracting air from the line of advance of the vehicle; the compression means compressing the extracted air; channeling means transferring the compressed air to a rear part of the vehicle; and an expulsion nozzle arranged in the rear part of the vehicle following the channeling means expelling the compressed air at a total energy greater than the pressure of the air in the front part of the vehicle.

In one of the embodiments of the present disclosure, the compressed-air propulsion means providing a regulation propulsion to the vehicle that takes the vehicle from the predetermined second speed to a third speed is contemplated.

Thus, the vehicle can advantageously depart in a controlled manner from the second predetermined speed, or cruising speed. This third speed can have multiple values, being a function of a predetermined speed map for the route.

Based on the above, the features of the present disclosure imply a multitude of advantages. Among them, there is the possibility of dispensing with loading onboard the vehicle all the energy necessary for its acceleration, with the consequent saving in volume and power that this entails. Loading more energy onboard to undertake the acceleration phase means loading a significant extra weight onboard, and therefore involves a greater energy expenditure to move it, requiring, in turn, more energy in the system.

Infrastructure costs are greatly reduced by reducing the length of linear motor required on the transport tube, as only one tenth to one hundredth of the total track length is required.

In terms of sustainability, the present disclosure can base its operation on 100% renewable energies, both for external (catapult) and internal (compressed air jet) propulsion, since the system presented moves the vehicle using a combination of electromechanical and electromagnetic energies, not requiring the use of fossil fuels, nuclear energy or any other source of polluting energy.

The indivisible combination for the propulsion proposed by the present disclosure, of initial thrust by electromagnetic catapult up to cruising speed plus regulating thrust of the cruising speed by compressed air, is especially advantageous for Hyperloop-type concepts operating in a very specific environment and operating model, which are the low-pressure conditions described, around a tenth of the Earth's atmospheric pressure, where the thrust caused by the air jet is sufficient to allow the cruising speed value to be varied quickly enough and where a structure equipped with a linear motor, which acts as an electromagnetic catapult, with sufficient distance so that said electromagnetic catapult allows the vehicle to reach the cruising speed at which the thrust by compressed air is useful.

The combination of the combined-propulsion system and method of the present disclosure is applicable to high-speed vehicles designed to move inside a low-pressure tube, regardless of the selected levitation system or the presence of additional resistance, such as the case of the use of wheels in the vehicle in the acceleration and braking phases or even during its entire journey. The only variation in the system design is that the total resistances must be taken into account to recalculate and adapt the propulsive forces.

BRIEF DESCRIPTION OF THE DRAWINGS

To complete the description of the present disclosure, and for the purpose of helping to make the features thereof more readily understandable, according to a preferred exemplary embodiment thereof, a set of drawings is included wherein, by way of illustration and not limitation, the following figures have been represented.

DETAILED DESCRIPTION OF THE INVENTION

The present disclosure discloses a combined propulsion method and system for high-speed vehicles that move under low-pressure conditions inside a tubular transport structure.

The combined propulsion method and system of the present disclosure is adapted to operate in pressure environments that are completely safe for vehicle occupants. Preferably, the pressure range handled by the present disclosure inside the transport tube is between 65 mbar and 250 mbar.

Although other low-pressure scenarios are contemplated, all of them are far from the usual ones in the state of the art for these transport systems (normal conditions are between 1 mbar and 10 mbar), since the minimum pressure limit inside the tube transport handled by the present disclosure is given by the Armstrong limit. The Armstrong limit is the altitude that causes atmospheric pressure to be so low (about 0.63 atmospheres) that water boils at normal human body temperature (37° C.), which occurs naturally at a height of about of 20 kilometers. Under these conditions, human beings cannot survive in a depressurized environment, therefore, for safety reasons, the present disclosure imposes said pressure as a minimum safety value, which allows users to resort to oxygen masks in the event of an accidental depressurization and avoid fatal consequences.

Under these described safety pressure conditions, propulsion of the vehicle is achieved with a combined and symbiotic solution that allows taking advantage of the properties of the air to achieve the transport of passengers at high speeds in an efficient and safe way. Specifically, the propulsion system is formed, on the one hand, by the electric propulsion means arranged on the transport structure itself and, on the other hand, by the jet propulsion means loaded onboard the vehicle. The combined use of the two systems allows the vehicle to be accelerated from a standstill using electric propulsion, as an electromagnetic catapult, and take it to high speeds and, once the vehicle has been accelerated up to a determined cruising speed or a speed close to cruising speed, maintain and adjust the speed using only the jet propulsion means.

The length of the electric propulsion means is limited, covering distances between 10 and 100 times less than the total length of the transport tube. Once the vehicle leaves the area of influence of the electric propulsion means, it only has the jet propulsion means to maintain its speed and make adjustments to same by varying the compressed air jet. In the safety pressure ranges in which the present disclosure works, around one tenth of atmospheric pressure, the thrust caused by the air jet generated by the jet propulsion means is sufficient to adjust and maintain the desired cruising speed values quickly enough.

Figure 1:
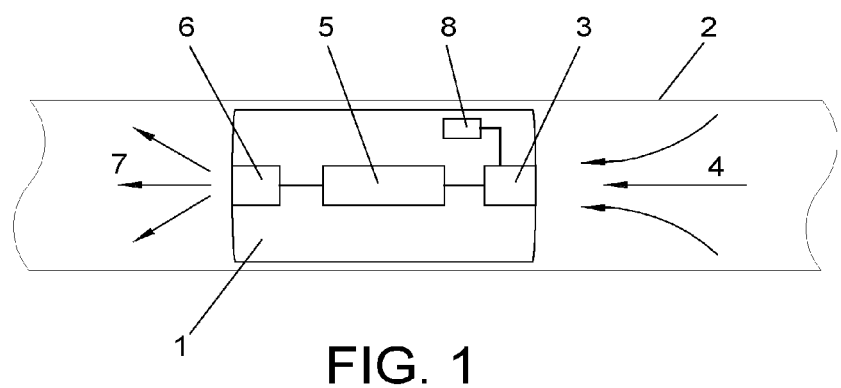
FIG. 1 schematically shows the main components of a vehicle inside a transport tube according to one of the embodiments of the present disclosure.

FIG. 1 schematically shows a vehicle 1 inside a transport tube 2, according to one of the embodiments of the present disclosure, where the front part of the vehicle has a compressor 3 that, with its rotational movement, moves the air 4, removing it from the line of advance of the vehicle. At the same time, due to its ability to act as a compression mechanism, within a certain range of rotational speeds controlled by control means 8, the pressure of the air extracted from the front part increases. The air is transferred by channeling means 5, such as a tube arranged in the lower part of the vehicle, to the rear part, where by means of an expulsion nozzle 6 this air is expanded 7 with enough energy to generate the thrust that overcomes the little remaining drag, causing the vehicle to behave transparent to the air at cruising speed.

The outlet of the compressor can have a turbine arranged in the path followed by the air flow, after the channeling means, and designed to be activated by said air flow. This configuration harnesses the airflow to generate electrical energy that can be used as a dedicated source of energy for compressor operation, alternatively or in combination with auxiliary electrical batteries, or to power the vehicle's electrical system.

The compressor 3 in the front part of the vehicle is capable of transferring a large part of the incident flow that would otherwise have to surround the vehicle, being blocking in the channel around same and preventing it from reaching the expected speeds. Thus, the configuration shown in FIG. 1 combines in the same system the functionality of reducing the aerodynamic drag of the vehicle with the ability to generate propulsion.

In one of the embodiments of the present disclosure, the best operating results require the transfer of a certain air flow, reaching an optimal point in terms of energy efficiency when the vehicle speed approaches cruising speed. Consequently, the system is designed so that it is the electromagnetic catapult that initially propels the vehicle until it reaches a determined linear speed, in which the mass flow rate handled by the compressor is located in a preferential area of its line of operation, from which speed the thrust is balanced with the total drag.

Figure 2:
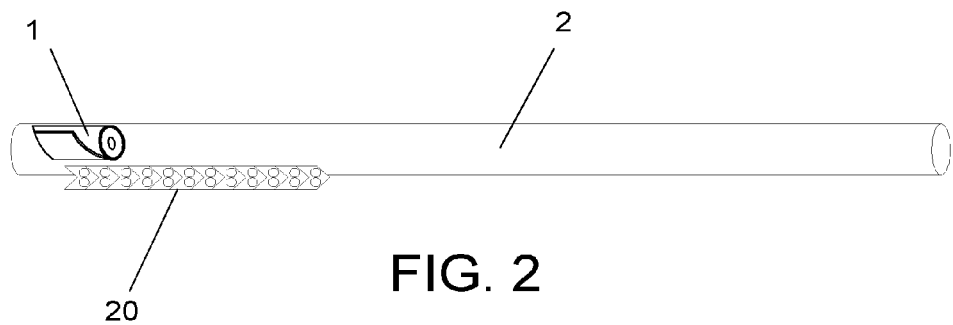
FIG. 2 schematically shows an embodiment of the present disclosure, where the vehicle is in the initial position stopped inside the low-pressure transport tube.

FIG. 2 shows an embodiment of the present disclosure wherein the vehicle 1 is in the initial standstill position, placed inside tube 2 at low pressure, for example 100 mbar in this case, and ready to start the launch. The initial acceleration of the vehicle is provided by electric propulsion means 20 installed in an initial section of the transport tube, such as a low acceleration linear motor, for example. The length of the linear motor is limited, since it is only used to launch the vehicle up to cruising speed or near cruising speed, by way of a catapult.

The linear motor can be made up of just one or several electric machines, all located at the beginning of the journey, one behind the other, but there does not have to be physical continuity between them. That is to say, although operationally the linear motor is a single motor, the technical implementation may require several steps arranged one after the other chaining several motor-type electric machines in series.

Figure 3:
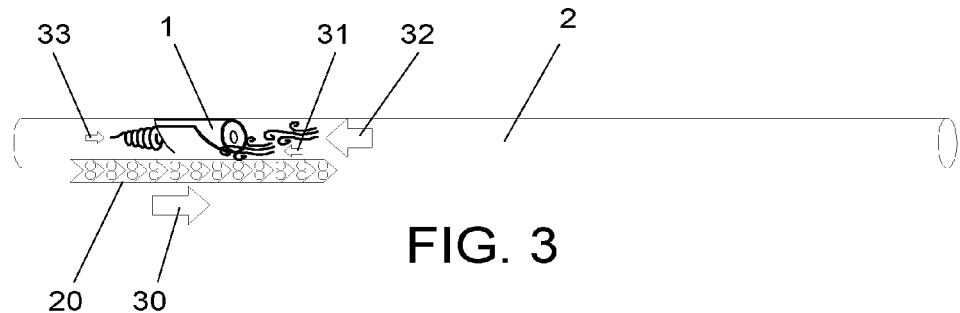
FIG. 3 shows, on the same diagram as in the previous figure, a situation in which the launch has begun and the vehicle is being accelerated by the linear motor of the transport tube.

FIG. 3 continues the same scheme of FIG. 2, now depicting a situation in which the system has already started the launch of the vehicle, so that vehicle 1 gains speed as it advances through the inside of the tube 2 due to the action of the linear motor 20. In this intermediate step, the acceleration is mainly the product of the linear motor, or electromagnetic catapult, which causes the vehicle to overcome the total drag it faces, mainly due to aerodynamic phenomena. This comprises the resistive effect due to the friction of the low-pressure air 31 inside the tube and the force due to the pressure difference between the front and rear parts of the vehicle, aggravated by the piston effect 32 created by the opposing air volume. Simultaneously, the air propulsion system begins to work as the vehicle speed increases and, in addition to removing the incident air in the front part of the vehicle to reduce the demand for power required in the electromagnetic catapult, it begins to generate certain thrust 33. The thrust in this phase is still not enough to propel the vehicle on its own, but will continue to increase as vehicle speed increases.

Figure 4:
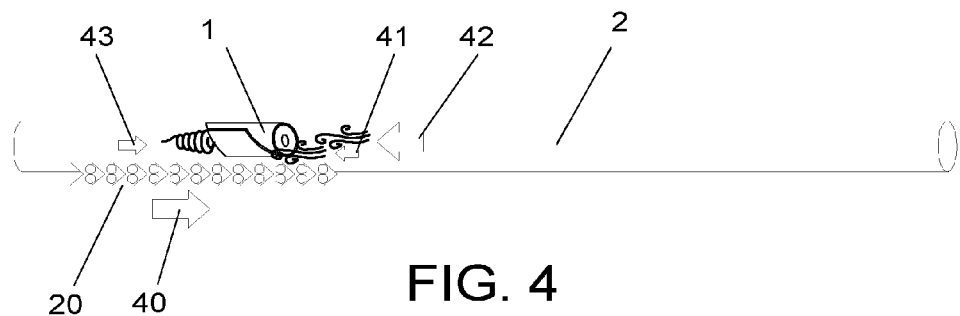
FIG. 4 shows, on the same diagram as in the previous figures, the situation in which the vehicle is approaching the end of the section of influence of the linear motor, where the speed is already very close to the target cruising speed.

FIG. 4 shows the situation in which the vehicle 1 is approaching the end of the section of influence of the linear motor 20, where the speed is already very close to the target cruising speed. At this point, the compressor of the jet propulsion means works by removing increasingly more incident air, which allows it to generate an increasing thrust 43 which, combined with the thrust 40 generated by the linear motor, exceeds the total drag that opposes the advance of the vehicle (including the resistance to advance caused by the resistive effect of the air friction 41 and the piston effect 42, aggravated by increasing speed), and gradually approaches the minimum value in which the contribution of the external propulsion of the linear motor is no longer necessary.

Figure 5:
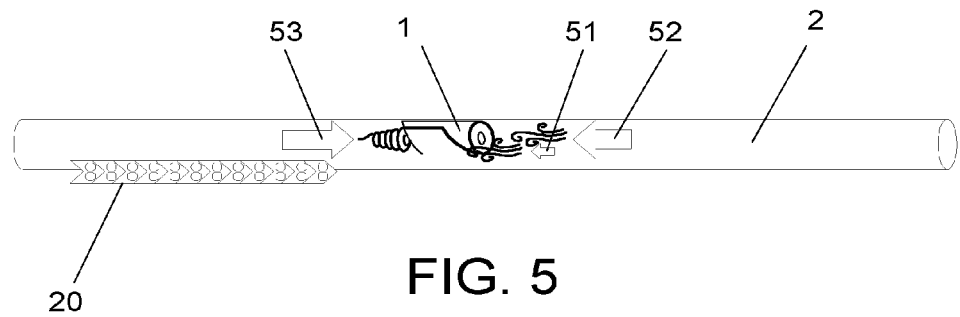
FIG. 5 shows, on the same diagram as in the previous figures, the situation in which the vehicle travels through the tube maintaining the cruising speed due to the thrust of the compressed-air propulsion means.

FIG. 5 shows the situation in which the vehicle 1 travels inside the tube 2 at the previously determined cruising speed. The vehicle has already exceeded the length of the linear motor 20 and is outside its influence, so the speed reached with the initial impulse, which takes the vehicle from standstill to high speed, in the absence of propulsion would begin to decrease drag forces little by little. To compensate for this loss of speed, unlike the state of the art where the construction of a discontinuous linear motor in the tube has been chosen for the most part to provide, every certain distance, a new impulse to the vehicle, the present disclosure uses the jet propulsion means loaded onboard the vehicle and described in FIG. 1 to generate all the necessary thrust 53 that maintains the cruising speed in a constant manner, compensating for the losses caused by the total drag, which mainly includes the resistance to advance caused by the resistive effect of the air friction 51 with the vehicle and the piston effect 52 created by the opposing air volume. Once the vehicle is already traveling at cruising speed or speed close to cruising speed, the jet propulsion means allow the speed to be adjusted thanks to the control means which, for example, by varying the speed of the compressor, control, in turn, the propulsion jet.

The length of the linear motor arranged in the initial section of the transport tube varies from one embodiment to another depending on the acceleration that is desired to impart to the vehicle (which influences passenger comfort) and the cruising speed to be reached.

In a case of use of an embodiment of the present disclosure, which is described by way of example, the distance of the transport tube between the origin and the destination is 1000 kilometers and the internal pressure of the transport tube is set at 100 mbar. With a 40-ton vehicle, 40 meters long and 4 meters in diameter, the linear motor that acts as an electromagnetic catapult is designed with a length of 10 kilometers to provide the vehicle with an acceleration of between 1 and 2 m/s² up to 600 km/h. Therefore, the vehicle leaves the electromagnetic catapult at 600 km/h, and that is when the complementary jet propulsion system loaded onboard the vehicle acts to keep that cruising speed constant and compensate for the existing total drag.

Alternatively, in a case of use similar to the previous one where the vehicle also leaves the electromagnetic catapult at 600 km/h, the compressed air jet propulsion means generate a thrust greater than that strictly necessary to compensate for the total drag and thus increase the speed of the vehicle to a cruising speed higher than the speed at which it leaves the catapult. By setting the cruising speed at 850 km/h, the jet propulsion means accelerate the vehicle until reaching said cruising speed and, once reached, they keep said speed constant for the rest of the journey.

In one embodiment, speed adjustments made by the jet propulsion system are based on controlling the speed of the compressor. A higher speed of the compressor corresponds to a greater compression of the air and, therefore, a greater thrust due to the increase in the difference in energy of the flow between the ends of the vehicle. Obviously, at a lower speed of the compressor, the opposite effect occurs and less thrust is generated. Other embodiments or extensions of the above could also include variable-geometry nozzles, or also variable-geometry compressors as means to regulate thrust.

For the purposes of this text, "air" is identified as the mixture of gases that allows normal and continuous breathing of humans, commonly called fresh air, but also any mixture of air with other additive gases that, used in a suitable proportion, can be used to improve the general performance of the system.

The present disclosure should not be limited to the embodiment described herein. Other configurations may be carried out by those skilled in the art based on the present description. Accordingly, the scope of the present disclosure is defined by the following claims.

The invention claimed is:

1. A combined propulsion system for high-speed vehicles, in a forced vacuum, comprising:
   a closed tubular guiding structure;
   a vehicle configured to move inside the tubular structure;
   at least one vacuum pump coupled to the closed tubular structure configured to provide a low-pressure atmosphere inside the structure, wherein the low pressure provided by the at least one vacuum pump, is in a range between 65 mbar and 250 mbar;
   electric propulsion means of the linear motor type arranged in an initial section of the structure, with a length relative to the tubular structure comprised between 15% and 1%, configured to provide an initial acceleration to the vehicle up to a first predetermined speed; and
   compressed-air propulsion means arranged on the vehicle, configured to provide an additional acceleration to the vehicle up to a second predetermined speed and, once the second predetermined speed is reached, maintain the second predetermined speed constant,
   wherein the compressed-air propulsion means are further configured to provide a regulation propulsion to the vehicle that takes the vehicle from the second predetermined speed to a third speed, and
   wherein the third speed represents a set of speed values defined in a predetermined speed map for the route that the vehicle will use as a reference.

2. The system according to claim 1, wherein the compressed-air propulsion means arranged on the vehicle are configured to provide the additional acceleration to the vehicle before the vehicle reaches the first determined speed, thus resulting in a total acceleration of the vehicle during the initial section of the structure which is the sum of the initial acceleration provided by the electric propulsion means of the linear motor type and the additional acceleration provided by the compressed-air propulsion means.

3. The system according to claim 1, wherein the first predetermined speed and the second predetermined speed are equal to a single predetermined cruising speed.

4. The system according to claim 1, wherein the vehicle is adjusted to the third speed by varying the thrust generated by a compressed air jet.

5. The method according to claim 1, wherein the vehicle is adjusted to the third speed by varying the thrust generated by a compressed air jet.

6. The system according to claim 1, wherein the compressed-air propulsion means comprise:
   compression means arranged in a front part of the vehicle, configured to receive and compress air extracted from the line of advance of the vehicle;
   channeling means configured to receive the air compressed by the compression means and transfer it to a rear part of the vehicle; and
   an expulsion nozzle arranged at the rear part of the vehicle following the channeling means, configured to receive the compressed air and expel it at a higher energy than that of the air at the front part of the vehicle.

7. The system according to claim 6, wherein the propulsion means further comprise a turbine arranged between the channeling means and the nozzle, configured to generate energy when activated by the compressed air received by the channeling means.

8. The system according to claim 6, wherein the compression means are connected to the channeling means in such a way that the channeling means can receive up to 100% of the air compressed by the compressor.

9. The system according to claim 6, wherein part of the air compressed by the compressor is conducted for uses other than propulsion.

10. The system according to claim 6, wherein the channeling means comprise at least one compressed air tank to store at least part of the air received.

11. A combined propulsion method for a high-speed vehicle configured to move inside a closed tubular guiding structure comprising:
   providing, by at least one vacuum pump, a low-pressure atmosphere inside the tubular structure comprised between 65 and 250 mbar;
   accelerating, by electric propulsion means arranged in an initial section of the structure, with a length relative to the tubular structure comprised between 15% and 1%, the vehicle from standstill to a first predetermined speed;
   propelling, by compressed-air propulsion means arranged on the vehicle, the vehicle up to a second predetermined speed and, once the second predetermined speed is reached, keeping it constant; and
   providing, by the compressed-air propulsion means, a regulation propulsion to the vehicle that takes the vehicle from the second predetermined speed to a third speed,
   wherein the third speed represents a set of speed values defined in a predetermined speed map for the route that the vehicle will use as a reference.

12. The method according to claim 11, wherein the step of propelling the vehicle, by the compressed-air propulsion means, begins before the vehicle leaves the initial section of the structure and ends the acceleration step by means of a linear motor.

13. The method according to claim 11, wherein propelling the vehicle, by the compressed-air propulsion means, comprises:
- extracting, by compression means arranged in a front part of the vehicle, air from the line of advance of the vehicle;
- compressing, by the compression means, the extracted air;
- transferring, by channeling means, the compressed air to a rear part of the vehicle; and
- expelling, by an expulsion nozzle arranged in the rear part of the vehicle following the channeling means, the compressed air at a higher energy than the energy of the air in the front part of the vehicle.

\* \* \* \* \*